Dec. 27, 1932.  A. E. HONEY  1,892,617
AUTOMATIC REGULATING, CONTROLLING, AND SWITCHING MEANS FOR
ELECTRICAL TRAIN LIGHTING AND LIKE INSTALLATIONS
Filed Feb. 24, 1930   8 Sheets-Sheet 5

Dec. 27, 1932. A. E. HONEY 1,892,617
AUTOMATIC REGULATING, CONTROLLING, AND SWITCHING MEANS FOR
ELECTRICAL TRAIN LIGHTING AND LIKE INSTALLATIONS
Filed Feb. 24, 1930 8 Sheets-Sheet 6

Inventor
Alfred E. Honey
By Sommers-Young
attys

Dec. 27, 1932.     A. E. HONEY     1,892,617
AUTOMATIC REGULATING, CONTROLLING, AND SWITCHING MEANS FOR
ELECTRICAL TRAIN LIGHTING AND LIKE INSTALLATIONS
Filed Feb. 24, 1930     8 Sheets-Sheet 7

Inventor.
Alfred E. Honey.

Dec. 27, 1932.  A. E. HONEY  1,892,617
AUTOMATIC REGULATING, CONTROLLING, AND SWITCHING MEANS FOR
ELECTRICAL TRAIN LIGHTING AND LIKE INSTALLATIONS
Filed Feb. 24, 1930  8 Sheets-Sheet 8

Patented Dec. 27, 1932

1,892,617

UNITED STATES PATENT OFFICE

ALFRED EDWARD HONEY, OF ILFORD, ENGLAND, ASSIGNOR TO J. STONE & COMPANY LIMITED, OF DEPTFORD, ENGLAND, A CORPORATION OF GREAT BRITAIN

AUTOMATIC REGULATING, CONTROLLING, AND SWITCHING MEANS FOR ELECTRICAL TRAIN LIGHTING AND LIKE INSTALLATIONS

Application filed February 24, 1930, Serial No. 430,891, and in Great Britain March 1, 1929.

The object of this invention is to provide automatic regulating and switching means for train-lighting and like electrical installations which shall be free from the common defects of known automatic electric regulators and switches. In the first place the electro-magnetic solenoid devices commonly employed are adversely affected, from the point of view of accurate sensitive action, by the changing of the value of the air-gap or magnetic reluctance. In the second place such devices possess little power for effecting a regulating or like operation unless they are made of unduly large dimensions. Finally all such devices have a temperature coefficient so that their accuracy cannot be relied upon under all conditions. The result is that apart from being unreliable as to accuracy, such devices are liable to hunting and spasmodic action which is very disadvantageous in practice.

The invention provides a combination of dynamo-electric and mechanical means for the purpose set forth, the dynamo-electric means being responsive to electrical variations in the circuit or installation to be regulated or controlled and the mechanical means being driven by the dynamo-electric means and operative for providing the mechanical effort required for effecting the regulating, controlling or switching operation. Thus, an electric motor having a constant excitation field magnet and sensitive to changes in the circuit or installation is coupled with a governor device adapted for adjusting resistance in such a manner as to obtain constant or other desired conditions in the circuit or installation.

A further object of the invention is to improve the regulation of single battery installations on railway trains. In these installations it is important, for example, to maintain a close regulation of the voltage at which the current is passed to the consuming circuits, particularly the lamp circuits. Regulation is also necessary to ensure predetermined conditions during charging of the battery of the installation.

Another object of the invention is to provide in the electro-mechanical combination, an electric motor having a substantially straight line characteristic, that is a speed varying closely with changes in its circuit conditions. To this end the motor preferably has a permanent field magnet, such as a cobalt steel magnet.

Yet a further object of this invention is to provide a regulator for use when the controlling electrical variation is comparatively small, said small variation being utilized to produce electrically a larger speed change whereby the mechanical part of the combination is enabled to exert the effort necessary for the regulating or other function.

Further objects of the invention are concerned with the provision of simple yet reliable and robust individual elements of the electro-mechanical combination and in their arrangement in such a fashion as to allow of easy inspection and replacement even by an inexpert operator. The mechanical system and the disposition of the regulating, controlling or switching contacts will naturally depend upon the precise nature of their function.

These and other features of the invention will now be explained by reference to the accompanying drawings in which:—

Figures 9 and 9ª are circuit diagrams illustrating two applications of the invention.

Figure 12 a perspective view of release mechanism and

Figure 13 a sectional detail of a contact.

Figure 14 is a circuit diagram incorporating an arrangement such as is shown in Figures 10 to 13, Figure 14ª is a circuit diagram showing a modified arrangement for lamp voltage regulation and Figure 15 is a similar diagram illustrating a modification of the lamp voltage regulating arrangement of Figure 14a.

Referring primarily to Figures 1 to 8, the construction of the lamp-voltage regulator illustrated in said figures will first be described. As has been stated the regulator comprises a dynamo electric device and a mechanical system driven thereby. The dynamo electric device takes the form of an electric motor the armature iron of which is in two parts 1 and 2 traversed by common armature conductors 3 connected to a single commutator 4. The conductors 3 have a generous cross section of copper so that the armature is of low resistance, is not liable to heat up and is free from appreciable temperature variation defects. The major part 1 of the armature iron lies in the field of a permanent bipolar magnet 5 the shape of which can be clearly seen from Figure 6. The permanent magnet is of highly magnetized cobalt steel, it having been found that this steel gives the greatest permanence and reliability. The permanent field magnet is virtually composed of two horse shoe magnets having common north and south pole pieces 6, a constriction 7 being formed at about the middle of each pole piece to encourage the flux to pass across through the armature iron 1. This motor will, if a variable voltage is placed across its terminals, run at a speed which varies very closely as the terminal voltage. Similar results can be obtained with field electro-magnets which are wound so that the energization produces magnetic super saturation.

Figures 6, 7, 8:
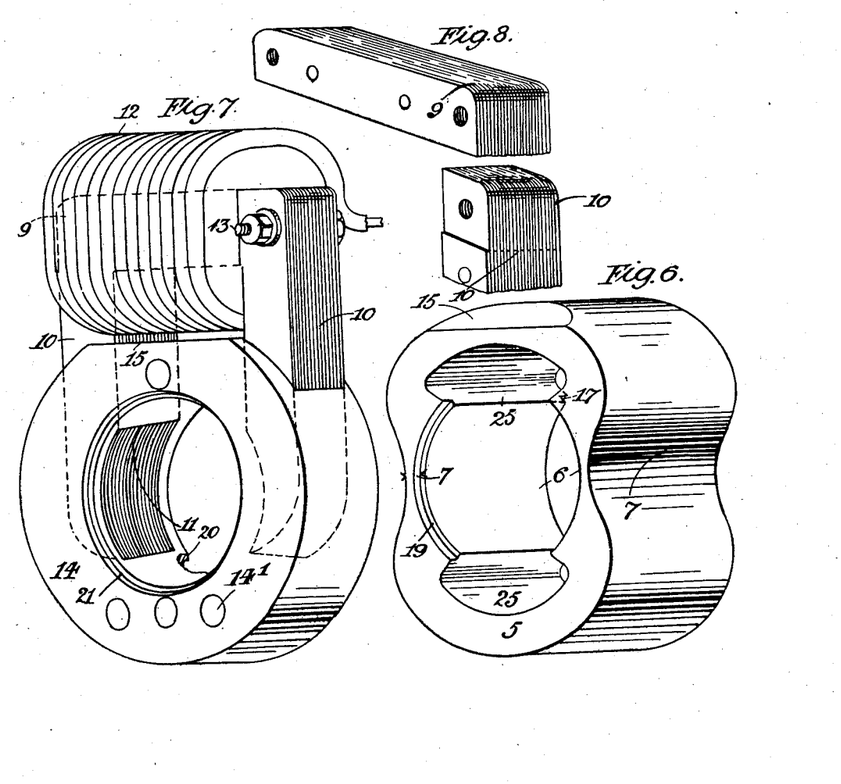

The smaller section 2 of the armature lies in the field of an excited bipolar magnet 8 consisting of a laminated yoke 9, alternate laminations of which are cut-off short at the ends to interleave with the similar laminations of magnet limbs 10 terminating in pole pieces 11 (Figure 8). The field winding or windings 12 are arranged on the yoke 9 and for inspection or renewal purposes may be removed from the magnet merely by taking out the bolts 13 holding the magnet frame together. In order that the magnet limbs 10 and pole pieces 11 shall remain securely in position independently of the yoke 9, said limbs 10 are cast, in the course of their manufacture, in a non-magnetic, e. g. gun-metal, core which is subsequently turned out to the correct bore to receive the armature. In this state it presents the form of an annulus 14 the inner surface of which discloses the pole faces of the pole pieces 11 (Figure 7). The polar horns are shaped slightly askew as shown. It will be appreciated that the magnet winding 12 and yoke 9 can be removed even by an inexpert operative without interfering with the setting of the pole pieces 11 in relation to the armature. The magnet 5 and annulus 14 are shown flattened at 15 to facilitate the accommodation of the winding 12.

As it is undesirable that the magnet 5 should be tapped or bored in any way, it is convenient for said magnet to be supplied by the makers in the form shown in Figure 6. In this case the magnets 5 and 8 may be held together and supported from a casing wall 16 of the regulator in the following simple manner. The magnet block 5 is recessed at 17 to engage a spigot 18 on the wall 16 and at 19 to engage a spigot 20 on the annulus 14. The opposite face of the annulus 14 is recessed at 21 to engage a spigot 22 on an end ring 23. Said end ring 23, the annulus 14 and the wall 16 are bored to allow the passage of long non-magnetic bolts 24 which pass freely through the magnet block 5 by way of the arch shaped spaces 25 above and below the armature 1, 2. The bolt holes in the annulus are threaded for a part of their length (Fig. 4) so that it is only necessary to screw the bolts 24 into the annulus 14 to bind the entire magnet structure securely to the wall 16. The end ring 23 can then be secured in position by tightening the nuts 26. Spring washers 27 are interposed between the bolt-heads and nuts and the surfaces on which they take. The end ring 23 supports a ball bearing 28 for the armature shaft 29 and also brush gear 30 for the commutator 4 by means of a spider 31 carried by lateral extension arms 32. The bearing and brush gear are thus removable without upsetting the magnets 5, 8. The commutator, bearing and brush gear are protected by a cover 33.

At the end remote from the bearing 28 the motor shaft 29 is not carried in a bearing but is connected in a releasable fashion to a governor shaft 34. For this purpose the end of the shaft 29 is enlarged to form a hollow head 35 across the interior of which extends a pin 36. This pin 36 is engaged by a slotted and somewhat spherical head 37, on the shaft 34, which fits freely in the interior of the hollow head 35, the slot being long enough to allow of relative lengthwise movement of the shafts 29 and 34. A compression spring 38 is inserted within the head 35 and bears on the head 37 through a washer 39. Close behind the slotted head 37 the end of the shaft 34 is journalled in a ball bearing 40 mounted in a spider 41 secured to the casing wall 16. From the foregoing description it will be evident that the motor armature may be removed from the regulator without interfering with the governor mechanism or bearings, thus facilitating repair, replacement and like operations. Furthermore the resilient coupling 35—39 between the shafts 29, 34 makes precision in remounting and centering the armature of little importance as a certain degree of self-adjustment is provided thereby.

Figure 3:
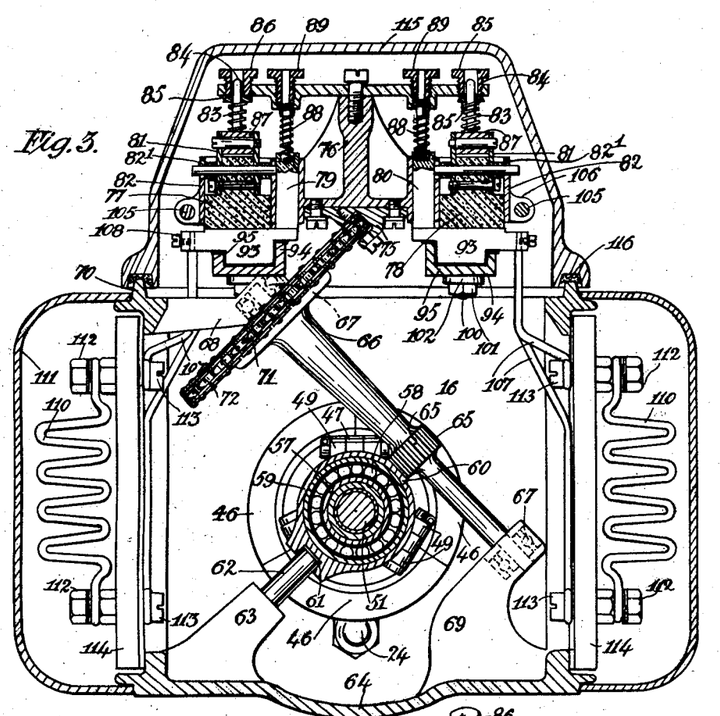
Figure 3 a cross section on the line III—III of Figure 4.
Figure 4:
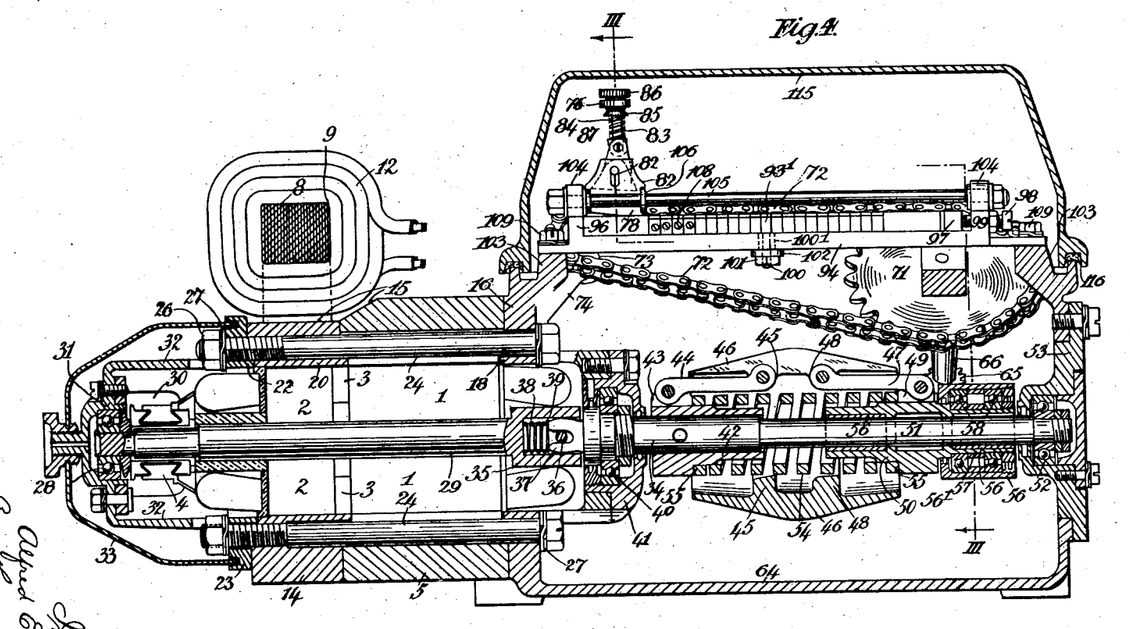
Figure 4 a longitudinal axial section.
Figure 5:
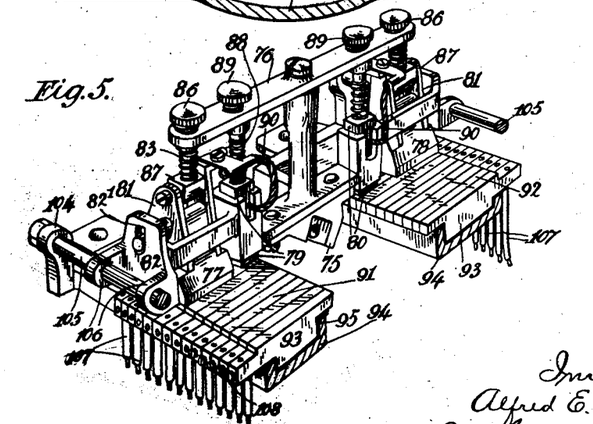
Figures 5, 6, 7 and 8 are perspective details of the brush gear, permanent field magnet, excitable field magnet and yoke for the latter.

On the governor shaft 34 is pinned a fixed sleeve 42 having three pairs of lugs 43 in each of which one end of a link 44 is pivoted. At their other ends the links 44 are pivotally connected to internal shoulders 45 on three similar governor weights 46 which when "in" form a closed body of a substantial barrel shape (Figure 4), said body being equally divided lengthwise into the three weights. Links 47 pivoted to shoulders 48 on the weights 46 are connected pivotally to lugs 49 on an axially movable sleeve 50 slidably mounted on a reduced portion 51 of the shaft 34. The extreme end of said shaft portion 51 is journalled in a ball bearing 52 mounted in the end plate 53 of the casing. Provision is made, as shown, for proper lubrication and attention to the ball bearings 28, 40 and 52 without unnecessary interference with the regulator as a whole. The governor spring 54 coiled around the shaft 34 abuts against shoulders 55 on the sleeves 42 and 50. As shown in Figures 3 and 4 said spring is totally enclosed by the weights 46 when in the closed position and is thus protected against damage or unauthorized interference. The weights 46 should be comparatively heavy firstly to give a mechanical effort sufficient for performing the regulating function and secondly to resist momentary influences which might make the regulation jumpy. The necessary weight may be provided by thickening the members 46 at the middle as shown in Figure 4. Solid compression of the spring 54 is prevented by contact of the sleeves 42 and 50.

Friction between the shaft 51 and sleeve 50 is reduced as far as possible by the provision in the latter of two graphite lined bushes 56 and an annular recess 56' filled with graphite and grease. The axial movement of the sleeve 50 produced by the concerted governor motion of the weights 46 may be employed for regulating purposes in various ways. The means which will now be described by way of example have proved suitable for effecting lamp-voltage regulating operations in train lighting installations:—
Mounted upon an extension part 57 of the sleeve 50 by ball bearings 58 is a non-rotatable sleeve 59 carrying a rack 60. This rack 60 extends along the length of the sleeve 59 (Figure 3), its axis lying in a plane at 45° to the vertical plane of the governor. Diametrically opposite the rack 60 the sleeve 59 is formed with a longitudinal groove 61 engaged by a finger 62 mounted in a projection 63 integral with the base 64 of the casing. The sleeve 59 is thus capable of sliding to and fro with the sleeve 50 but is prevented from rotating therewith, the sleeve 50 rotating freely in said sleeve 59 by virtue of the ball bearing 58. The rack 60 meshes with a pinion 65 fixed on an oblique spindle 66 journalled in upper and lower ball bearings 67 carried by arms 68 and 69 projecting from an upper lateral frame member 70 and the casing base 64 respectively. Fast on the upper end of the spindle 66 is a large sprocket wheel 71 around which runs an endless chain 72 carried around a small guide sprocket wheel 73 mounted in a ball bearing upon an arm 74 extending from the end wall 16. One of the links of the upper limb of the chain is detachably connected to an obliquely slotted insulating member 75 attached to an H shaped brush frame 76. The diameters of the pinion 65 and sprocket wheel 71 are designed to give the requisite gear ratio between the movement of the governor sleeve and that of the brushes.

The brush frame 76 comprises holders for main brushes 77, 78 and auxiliary brushes 79, 80. Each main brush is of substantially triangular shape but the base consists of two faces (Figure 4) at a slight angle with each other the object of which will be explained hereinafter. The brushes 77, 78 are each secured in a rocker 81 pivotally mounted in a holder 82 on the brush frame 76 by means of trunnions engaging slots 82'; the latter allow for brush wear. Each rocker 81 is acted upon by a spring 83 coiled around a guide pin 84. At its upper end the spring 83 abuts against a washer 85 the curved upper face of which fits in the dished lower end of an adjusting plug 86 screwed in the upper bar of the H frame 76. The pin 84 passes freely through the washer 85. At its lower end the spring 83 abuts upon a pivotal block 87 in which the pin 84 is mounted. It will be seen that if one face of the brushes 77, 78 is in the contacting position (e. g. the right face in Figure 4) the spring 83 diverges slightly from the symmetrical position to that side and it is necessary to compress said spring slightly before the brush can be thrown over into the opposite position. The resistance of the spring is sufficient to prevent the brush rocking unintentionally or remaining in the intermediate position. To eliminate any possibility of damage owing to the passage of a heavy or prolonged current across the sharp edge between the two brush faces, the small auxiliary brushes 79, 80 are provided. These are simple block brushes depressed by springs 88 the compression in which can be adjusted by screws 89. The brush rocker 81 and brush 79 (or 80) are connected by a flexible connection 90 and the brushes 77 and 78 are electrically connected by the frame 76.

Under the control of the chain 72 the brushes move to and fro over contact strips 91, 92 resembling flat commutators. These commutator strips are built up of segments 93 mounted in channel shaped bars 94 from which they are separated by insulation 95.

The segments of each strip separated by thin layers of mica, are held together between a fixed abutment 96 on the bar 94 and a press plate 97 engaged by a screw 98 taking in a fixed end plate 99 and provided with a lock nut. To prevent the pressure of the plate 97 causing a tendency for the strip to buckle upwardly the screw 98 is arranged above the centre of the segments 93. As a precaution, moreover, one or more individual segments 93 are anchored down. One such segment is shown in Figure 4 as held down by a screw 100 passing freely through a slot 100' in the bar 94 and screwed in the segment 93'. The nut 101 on said screw 100 is insulated from the bar 94 by an insulating washer 102 having a flange portion surrounding the screw 100 in the slot 100'. With an oblong slot 100' no precise alignment of the segment 93' is necessary. The bars 94 are mounted on lugs 103 from the casing and are themselves furnished with lugs 104 in insulation in which are supported guide rods 105. The brush frame 76 is carried and guided on these rods 105 by eyelets 106. The brush and contact gear is designed to facilitate inspection and replacement operations. Thus to remove said gear as a whole it is only necessary to disconnect the leads 107 from the segments 93 by loosening the screws 108, to remove the screws 109 holding down the bars 94 and to disconnect the chain 72 from the member 75. The replacement of one or more contact segments or an entire line of segments is an extremely simple operation.

Figure 1:
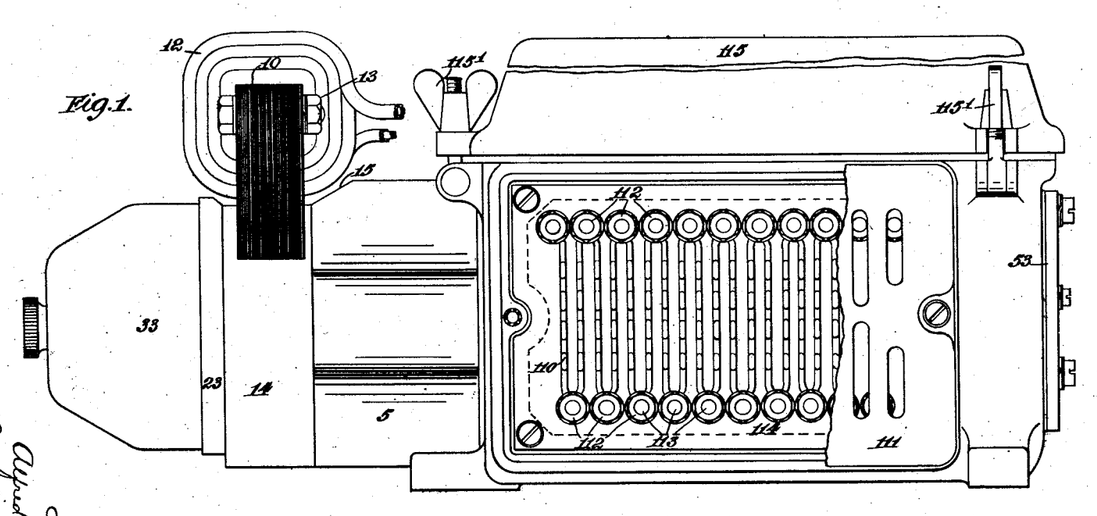
Figure 1 is a side elevation of one construction of lamp-voltage regulator embodying the invention.
Figure 2:
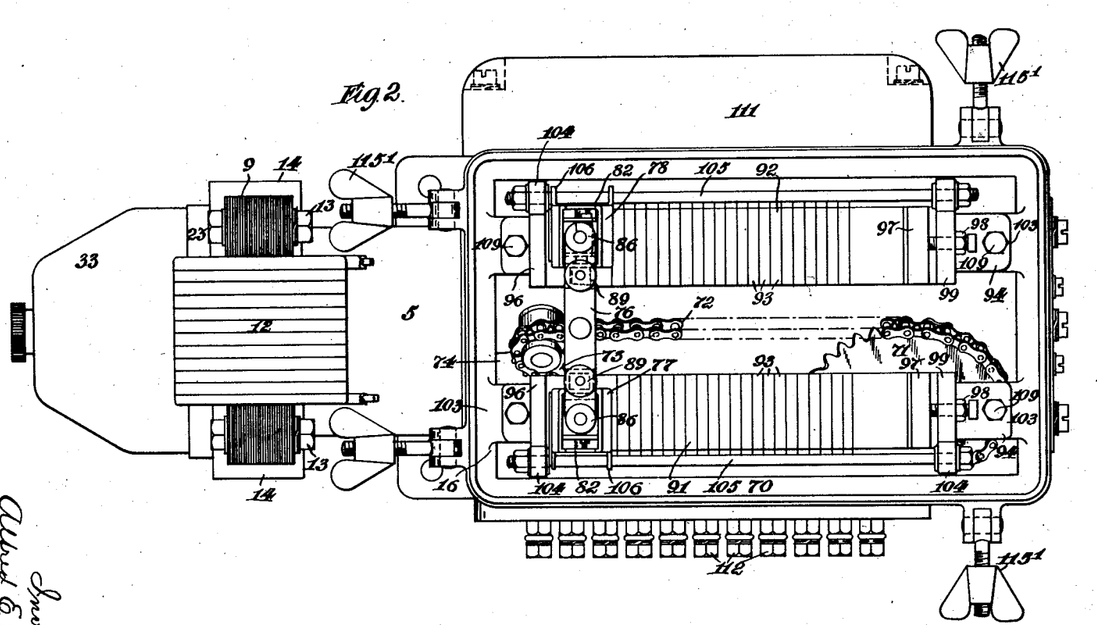
Figure 2 a plan view thereof with the cover removed.

As shown in Figures 1 and 3 resistance elements 110 connected between the segments 93 by the leads 107 are accommodated in spaces formed on either side of the governor part of the regulator by cover plates 111 slotted to facilitate cooling. Said resistance elements 110 consist of zig-zag sections of resistance wire clamped at the top and bottom between nuts 112 on terminal screws 113 mounted in heat resistant insulating plates 114. The screws 113 are connected behind the plates 114 to the leads 107. The top and bottom screws 113 are staggered and are connected in order to successive contact segments 93.

The casing is closed at the top by a cover 115 attached by hingedly mounted bolts and butterfly nuts 115'. A packing 116 of fibrous material serves to make a tight joint between the casing and cover. The external electrical connections to the regulator are conveniently made by terminals (not shown) mounted in the end wall 16 of the casing. The leads from the brush gear 30 may then be carried on either side of the lower bolt 24 through holes 14' in the annulus 14, through the lower space 25 in the permanent magnet and through holes in the end wall 16 up the inside of which they are then passed to be attached to the rear ends of said terminals.

Figures 9, 9A:
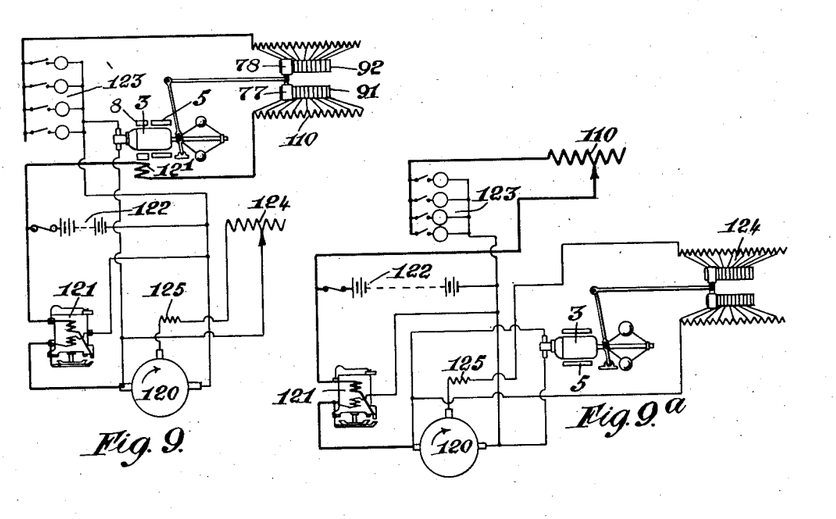
Figure 10:
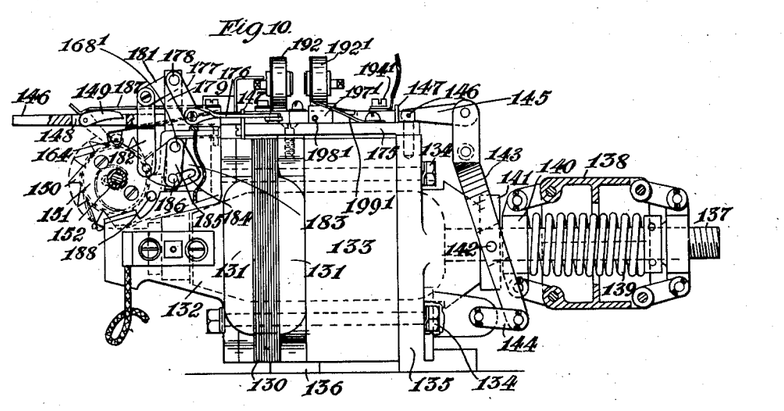
Figure 10 is an elevation of a second embodiment of the invention, a battery charging regulator or voltage control switch.
Figure 11:
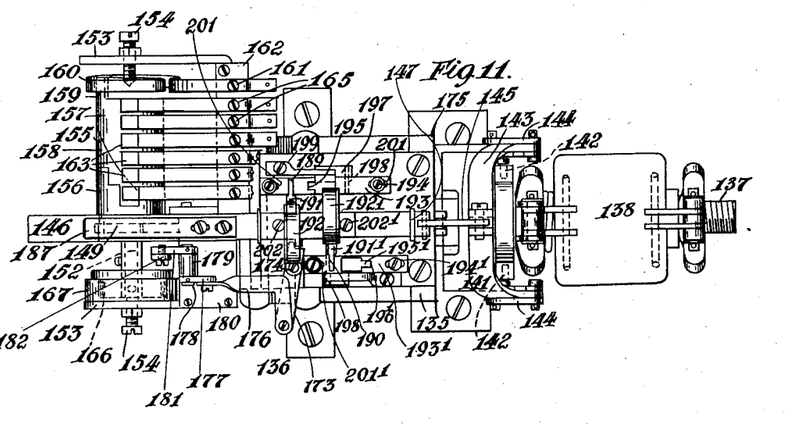
Figure 11 a plan view thereof.

The principle of his type of regulator in its simplest form will now be described by reference to Figure 9 illustrating the essentials only of a single battery train lighting system viz. dynamo 120, cut-in switch 121, battery 122 and lamp load 123. The regulator resistance composed of the elements 110 takes the place of the normal lamp resistance and is included in the positive lead to the lamps. It will be seen that the amount of resistance in series with the lamp load depends upon the position of the brushes 77, 78 connected by the frame 76. The armature 3 of the regulator motor is connected across the dynamo 120 and its speed will rise and fall with the dynamo voltage. Such variation in speed causes movement of the governor and adjustment of the brush frame. Thus a rise in dynamo voltage will result in a rise in motor-speed, outward motion of the governor weights and adjustment of the brushes 77, 78 to the right (Figures 4 and 9). In this simple arrangement the excited field on the motor may merely serve for adjustment or calibration purposes, it being possible by adjusting the excitation applied to it to calibrate the regulator to give the desired lamp resistance for any lamp load. Alternatively a series winding 12' on the auxiliary field magnet may be connected in series with the load and so calibrated as to adapt the regulation automatically to a varying lamp load. It is not essential that the resistance between the segments 93 should be equal nor that the width of the segments should be uniform. In fact by varying these values any desired curve of relationship between dynamo-voltage and lamp resistance can be obtained; for instance higher limiting resistance may be desirable for high dynamo voltages.

It will be noted that the segments of the commutator strips 91, 92 are staggered, this giving a more sensitive regulation with the brushes 77, 78 aligned. The object of mounting said brushes in rockers is to ensure as far as possible that the same lamp resistances are selected by the regulator at the various dynamo voltages during a rise of voltage as during a fall thereof, that is to obtain the same calibration for both directions of motion of the brush frame 76. It is necessary for this purpose to allow for the motion lost in the mechanical part of the apparatus when a change in the direction of movement of the frame 76 takes place. This is achieved satisfactorily by arranging that the brushes 77, 78 shall rock forward in the direction of new movement when a reversal of movement occurs. Figure 4 shows a brush 78 as it would appear when moving to the right, which movement it may be assumed to have just commenced. The right hand brush face is making contact and will continue so to do as long as movement to the right continues. If in due course the brush is moved to the left, friction will rock it so that its left hand face makes contact, the slight advance thereby achieved being sufficient to make up for the mechanical motion lost at the reversal.

Figure 9ª illustrates a second regulator element 124 which may be employed alone or in combination with that just described. This regulator which is constructed similarly to that described with reference to Figures 1–8, acts upon the dynamo field 125 and is intended to keep the dynamo voltage constant as far as possible in spite of variable dynamo speed. No further description thereof is necessary as the mode of operation is obvious.

The second construction of regulator shown is a battery charging regulator (Figures 10–13).

It may first be as well to refer briefly to the circumstances underlying the action of the battery charging regulator to be described: As is well known the back E. M. F. of a secondary battery rises progressively during charging. If therefore, in say a train lighting installation with an axle driven dynamo, a battery is charged from said dynamo with a constant current, the charging voltage will rise until at a point prior to complete charging certain undesirable phenomena, such as gassing, commence. If charging were then discontinued the battery would be incompletely charged. It is desirable therefore to continue the charging with a lower charging current, which can be done by modification of the charging conditions in some way, as by reduction of the dynamo excitation or by the introduction of series resistance. Such current reduction is of course accompanied by a drop in the charging voltage. After a period of charging at the lower rate the upper voltage limit will again be reached whereupon charging may be continued at a still lower rate. Thus the charging current may be cut down in any desired number of steps until the charge is complete. To obtain the best charging conditions for the battery the voltage variation for each charging stage is maintained within limits which preclude ill effects such as gassing. What is required of a regulator in this instance therefore is that it should be responsive to a certain maximum voltage across the battery and should be adapted to reduce the charging current successively to lower values. As the voltage variation during each charging stage of, say, a 12 cell train lighting battery may only be of the order of 2 to 3 volts use is advantageously made, according to one feature of this invention, of what may be termed an electro-mechanical relay arrangement. Thereby the attainment of the upper limit of a small voltage variation may be caused to release instantaneously a considerable mechanical effort sufficient for performing whatever switching operation is necessary in the external circuits. By such means, moreover, it is possible to provide a reliable regulator with a comparatively small current consumption.

The battery charging regulator differs from the lamp-voltage regulator chiefly in the mechanical mechanism employed. In construction the electrical part of the former regulator is substantially the same as the latter but will generally be on a smaller scale. In the example shown, moreover, the excited field magnet 130 is of a slightly different construction, being a laminated bipolar rectangular frame with windings 131. As in the previous case the end bearing bracket 132, the excited magnet 130 and the permanent magnet 133 are clamped together by bolts 134 also passing through the end frames 135 and 136. The armature shaft 137 carries two governor weights 138 which in the closed position form a cylinder around the spring 139. The weights are connected to an axially movable sleeve 140 rotatable in but immovable axially in relation to a non-rotatable annulus 141. Mounted upon trunnions 142 on the annulus 141 is a forked lever 143, hinged to lugs on the end frame 135 by links 144. At its upper end said forked lever 143 is pivotally connected by a link 145 to a sliding bar 146 which extends the length of the regulator and is mounted in slotted supports 147.

At the far end of said bar 146 a slot 148 is provided to accommodate a pawl 149 pivoted therein. This pawl 149 co-operates with the teeth 150 of a ratchet wheel 151 on a shaft 152 which is mounted in side plates 153 by means of adjustable screws 154 the points of which engage in the cupped ends (Figure 12) of said shaft. The side plates 153 are rigidly mounted on the regulator frame. The shaft 152 also carries a regulator drum 155 consisting (Figure 12) of a hardwood or other insulating core 156 with a triangular copper sheath 157 wrapped around a part of the surface thereof. Between the oblique edge of the sheath 157 and the insulating core 156 is a stepped strip 158 of metal which is unaffected by sparking. The metal sheathings 157 and 158 are in electrical connection while a lug 159 on the former is connected by about two turns of a coiled spring 160 with a terminal screw 161 mounted in an insulating strip 162. Corresponding to the number of steps in the sheathing of the drum and arranged to register with said steps are a number of spring contacts 163 bearing on said drum by anti-friction rollers 164. The spring contacts 163 are mounted on the insulation 162 by means of screws 165. The circuit or circuits regulated are connected to the screws 161 and 165 in a manner explained below.

At one end the shaft 152 is engaged by a clock-spring 166 which tends always to return the shaft in an anti-clockwise direction. The outer extremity of said return spring is anchored in a casing 167 mounted on one side plate 153. During normal operation of the regulator, the return of the drum 155 is prevented by a catch pawl 168 held in engagement with the ratchet teeth 150 by a leaf spring 169. The pawl 168 is provided with trunnions journalled in cheeks 170 mounted on the regulator frame by screws 171. It is necessary that this catch pawl should be releasable, for instance when the regulator shuts down because the dynamo of the installation has fallen below the cut-in speed. For this purpose a pin 172 on the bar 146 is adapted, when the speed of the regulator falls below a certain value, to move to the left (Figure 12) into contact with one end of a lever 173 pivoted at 174 in a plate 175 of hard insulating composition. The other end of said lever 173 is connected by a cranked and twisted link 176 with an arm 177 which is fast on a short shaft 178. The shaft 178 is journalled in an upstanding lug 179 on a plate 180 carried by the side plate 153. Fast on the end of said shaft 178 remote from the arm 177 is an arm 181 pivotally connected by a link 182 with an arcuate member 183. The last named member has an arcuate slot 184 and is loose on one trunnion 168' of the pawl 168. On the extremity of the same trunnion is fixed a short arm 185 with a pin 186 engaging in the slot 184. If the motion of the linkage caused by impact of the stop 172 on the lever 173 is followed out it will be found that it has the effect of imparting anti-clockwise rotation to the pawl 168, thereby disengaging the same from the ratchet teeth 150. In order that the return motion of the drum shall not then be impeded by the pawl 149, the latter is engaged, if the regulator slows down below the predetermined limit, by a leaf spring 187 which depresses the heel of the pawl 149 and moves the latter from the dotted line position to the full line position in Figure 10. The spring 187 is attached to the plate 180 and is out of engagement with the pawl 149 during the normal operation of the regulator. The drum 155 is prevented from returning beyond its initial position by a stop 188 which in that position engages against a cheek 170 (Figure 12).

In addition to the mechanism described the sliding bar 146 also controls electrical circuits. To this end it carries a pair of similar spring contacts 189, 190. The spring contact 189 consists of the end of a coiled spring 191 contained in a casing 192 attached to but insulated from the bar 146. Said contact is arranged to slide, during the operation of the regulator, over a metal contact bar 193 with a terminal screw 194. The continuity of the metal contact surface of the bar 193 is interrupted by a finger 195 of insulating material projecting obliquely down into a slot 196 (Figure 13) in the bar 193. This finger 95 extends into the slot from a small block of insulating material 197 pivoted at 198 to the bar 193. The finger is normally held with its end depressed into the slot 196 by a leaf spring 199. It will be appreciated that if the bar 146 moves to the right in the figures, the spring contact 189 will eventually break contact by riding up the finger 195 while continued such movement will carry said contact 189 over said finger to re-establish contact on the far side thereof. If now the contact 189 moves to the left it engages under the finger 195 (cut away at 200 to facilitate this) and can return to its original position by lifting the finger 195 against the spring 199. In this return motion, however, contact is not broken. Identical parts 191'—200' are provided in conjunction with the contact 190 but in this case the finger 195' breaks the continuity of connection between contact 190 and bar 193' during movement to the left. Said finger is therefore arranged oppositely to the finger 195. The contact bars 193, 193' are secured by the terminal screws 194, 194' and other screws to the insulating plate 175. Said screws pass through oblong slots 201, 201' in the bars allowing of an adjustment referred to hereinafter. Terminal screws 202, 202' are provided for the spring contacts 189, 190.

Figures 12, 13, 14, 14A:
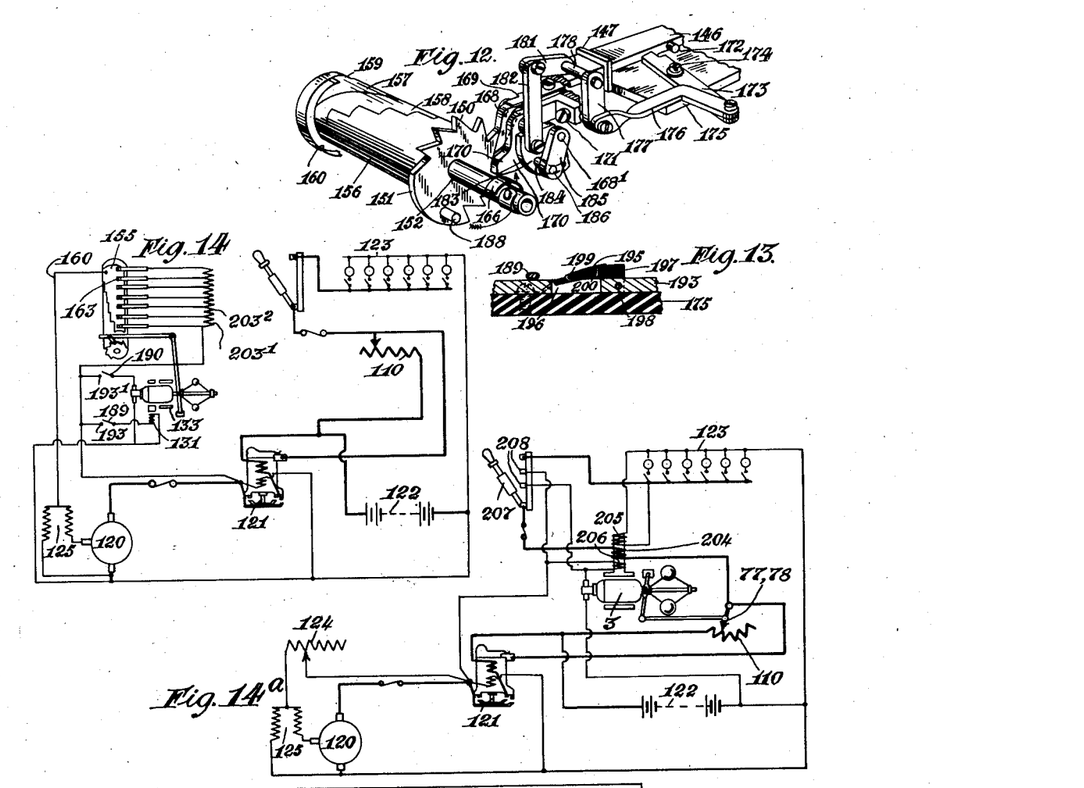

Referring to the left hand side of Figure 14, it will be seen that the contact 189, 193 is arranged in the circuit of the motor excitation winding 131 which is connected across the dynamo 120 of the installation. The contact 190, 193' is arranged in the armature circuit of the regulator motor, the armature being also connected across the dynamo 120. Resistances $203'$, $203^2$ etc. in the excitation circuit of the dynamo of the installation are controlled by the contact drum 155, said resistances being arranged so that they are all cut out in the initial position of the drum (Figure 14).

The operation of this regulator will now be described, it being assumed that the dynamo 120 is running at normal speed and that the battery 122 is fully discharged. The calibration of the regulator is made such that under these conditions the motor speed and governor setting bring the contacts 189, 190 on the bar 146 somewhat to the right of the positions shown in Figure 11. The pawl 149 is in a position of readiness to actuate the ratchet wheel 151. Under these conditions the dynamo 120 receives its maximum excitation and charges the battery 122 through the cut-in switch 121 at the heaviest rate. In due course the charging voltage will rise from the lower limit at which it commences to a predetermined limit at which it is desirable to cut down the charging current. This rise of voltage will have caused a slight rise of speed of the regulator motor and at the upper limit the governor causes the contact 189 to ride onto the finger 195 and leave the bar 193. This breakage of the circuit of the field 131, however, cuts down the excitation of the motor to that provided by the permanent magnet 133 and thus results in a comparatively large and sudden increase in speed of the motor by reason of which the bar 146 makes a correspondingly large and powerful movement to the right. The pawl 149 feeds the drum 155 through one step and introduces the resistance 203′ into the dynamo excitation circuit. The dynamo excitation is thus cut down and charging of the battery 122 continues at a decreased current. The above mentioned large movement of the bar 146 carries the contact 189 beyond the finger 195 and re-establishes the circuit of the motor field 131 while the contact 190 has been carried under the finger 195′ and slightly to the right thereof. Now the drop in charging voltage corresponding to the reduction of charging current and the re-establishment of the extra motor excitation cause a lowering of the motor speed and resultant movement to the left of the bar 146. This movement, which alone may be too sluggish for resetting the contacts 189, 190 is sufficient, however, to carry the contact 190 on to the insulating finger 195′, breaking the armature circuit of the regulator motor (or inserting resistance to reduce its current) and reducing its speed rapidly until the bar 146 resets the contact 189 in its initial position; at the same time the contact 190 re-establishes the motor armature circuit after riding over the finger 195′. Return of the drum 155 to its initial position when the pawl 149 is retracted by the bar 146, is prevented by the spring loaded catch pawl 168.

Again in due course the charging voltage will rise to the upper limit and the cycle of operations will be repeated. Charging will then be continued at a lower current with the resistances 203′, 203² in series in the dynamo excitation circuit. Eventually under these conditions the drum will be fully rotated to a position in which the resistances 203′, 203² etc. are all in series with the dynamo excitation cutting down the battery charging current to the so called trickle value. It has been found that six stages of reduction are suitable for this purpose. In the last drum position any motion of the bar 146 is ineffective for rotating the drum 155 as there are no ratchet teeth beyond the last step on the drum. It will be appreciated that the upper charging voltage limit may be set to a desired value, inter alia, by adjusting the contact bar 193 in relation to the contact 189. The sensitivity of the return action of the bar 146 may be adjusted by similar adjustment of the bar 193′.

If either during or after charging, the dynamo 120 falls below a predetermined voltage limit (corresponding say to the cut out voltage of the cut-in switch 121), the resultant fall in motor speed brings the stop 172 into contact with the linkage 173 etc. and disengages the catch pawl 168 from whatever tooth 150 it engages. At the same time the spring 187 depresses the heel of the pawl 149, leaving the drum free to be returned to its initial position by the spring 166. When the dynamo voltage again exceeds the predetermined limit (e. g. cut-in voltage) the pawls 149 and 168 will be released and the regulator will proceed to readjust the charging current to suit the conditions. Naturally if no discharge has taken place since the dynamo voltage dropped, the regulator will merely re-establish the charging conditions.

Figure 14ᵃ shows a lamp-voltage regulator according to the invention. It will be understood that the regulators shown in Figs. 14 and 14ᵃ could be employed in combination in an installation. The construction of the lamp voltage regulator shown in Figure 14ᵃ might be identical with that described with reference to Figures 1–8 and the mechanical part thereof has therefore been diagrammatically indicated merely by a brush 77, 78 moving over resistance 110.

The mode of controlling the speed of the regulator motor is, however, different and the arrangement shown on the right hand side of Figure 14ᵃ is in fact that preferred for lamp voltage regulation, being more sensitive and susceptible to exact calibration for all conditions than the arrangement shown in Figure 9. In place of the winding 12 the excited field of the regulator motor carries three windings 204, 205 and 206. The winding 204 is a magnetizing winding (with reference to the adjacent field of the permanent magnet) and is a series winding lying in the positive lead to the lamp load 123. This lead contains a main lighting switch which is indicated as a hand switch 207 but might be of any type. The winding 205 is (by reference to the same standard) a demagnetizing winding and is a potential winding permanently across the lamp leads. The winding 206 is a no load winding and when the switch 207 is open (no lamp load) lies in series with the armature 3 across the terminals of the dynamo 120. Said winding 206 is a magnetizing winding. Closure of the switch 207 short circuits the winding 206 by the auxiliary contacts 208 and connects the armautre 3 directly across the dynamo 120.

While variation in the dynamo voltage across the armature will still cause variation of the motor speed, the regulation by this arrangement is chiefly performed by the speed variations in the motor caused by variation of the excitation applied to the field magnet by the coils 204 and 205. Increase in the lamp current passing through the winding 204 increases the excitation of the motor and decreases the speed thereof. Through the governor and brush gear this speed decrease produces a decrease in the lamp resistance in series with the load. Decrease in lamp current brings about an opposite result. A similar regulating effect is provided by the winding 205. Increase in lamp voltage increases the demagnetizing effect of the excitation furnished by said winding and thereby causes an increase in motor speed and an increase in the lamp resistance. Both effects tend to keep the lamp voltage constant: The regulation of the resistance originating from the winding 204 is a coarse or selective adjustment depending upon the amount of load in circuit while the regulation by the winding 205 is a finer or vernier adjustment superimposed on the first to take account of variation of the dynamo voltage. The winding 206 facilitates starting and has what may be termed a "keeper" effect upon the adjacent permanent magnet under no load conditions.

Figure 15:
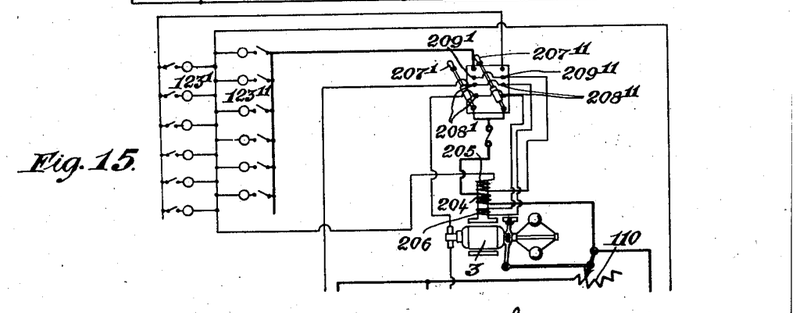

A modification of the lighting switch and regulator winding connections is shown in Figure 15 which illustrates an installation having two separate lamp loads 123', 123", controlled by two main switches 207', 207". Although again indicated as manual these switches might for example comprise the switch brushes of electro-magnetic switches, of which brushes one is closed for, say, so-called half lights while both are closed for full lighting. The short circuiting contacts for the winding 206 are duplicated (208', 208"). Moreover the winding 205 is not connected permanently across the lamp leads but is closed onto the same upon the closure of either main lighting switch through one of the auxiliary contacts 209', 209". Apart from these points the arrangement and operation are the same as in the case of Figure 14ª.

The above regulating and switching means have been described by way of example and it is to be understood that the invention is readily applicable to other regulating, controlling and switching purposes in train lighting and like installations. The precise nature of the switching mechanism will naturally depend upon the functions to be performed. The mode of control of the electrodynamic part of the regulator or the like will also depend upon the nature of the electrical variation involved, for instance whether the same is of a simple or intermittently progressive nature. Obviously a fraction only of the electrical variable might, if desired, be applied to the regulator by the use of shunts or like means. Where the excited field magnet on the motor of the regulator or the like is not the speed control means proper, it may be arranged to be brought into operation automatically when abnormal conditions demand some modification of the normal regulation or other switching function. In some circumstances it may be desirable to replace the governor devices described by governors having two springs or ranges of springs, the lighter springs only coming into action at first and the more heavily resistant at higher governor speeds.

I claim:—

1. Automatic switching means for train lighting and like installations, comprising an electric motor having a cobalt steel permanent field magnet built up of a plurality of opposed horseshoe magnets of constricted cross-section at the points of junction between their limbs at which points the pole pieces are formed, a centrifugal governor driven by said motor, a control switch device and an operative mechanical connection between said governor and switch device.

2. Automatic switching means for train lighting and like installations, comprising an electric motor having a substantially constant main field magnet and an auxiliary excitable field magnet, a centrifugal governor driven by said motor, a control switch device and an operative mechanical connection between said governor and switch device.

3. Train lighting or like electrical installation comprising automatic switching means embodying in combination an electric motor armature, current supply means for said armature, a substantially constant field magnet and an auxiliary excited field magnet effective upon said armature, electrical connections between said excited field magnet and said installation, a switching device in said installation and a mechanical system, including a centrifugal governor driven by said motor armature and an operative connection with said switching device.

4. Automatic switching means for train lighting and like installations, comprising an electric motor armature, a permanent field magnet and an auxiliary excitable field magnet effective upon said armature, a removable yoke for said auxiliary magnet, an exciting winding upon said yoke, said winding being removable upon said yoke without interference with the rest of the magnet, a centrifugal governor driven by said motor armature, a control switch device and an operative mechanical connection between said governor and switch device.

5. Automatic switching means for train lighting and like installations, comprising an electric motor armature, a permanent field magnet effective upon said armature, a non-magnetic body adjacent said magnet and embracing said armature, magnet pole pieces securely embedded in said body, a magnet yoke detachably connected to said pole pieces, an exciting winding upon said yoke, a centrifugal governor attached to said armature, a control switch device and an operative connection between said governor and said switch device.

6. Automatic switching means for train lighting and like installations, comprising an electric motor armature, a permanent field magnet effective upon said armature, an auxiliary excitable field magnet arranged immediately adjacent said permanent magnet and exerting a keeper effect thereupon, a centrifugal governor attached to said armature, a control switch device and an operative connection between said governor and said switch device.

7. Automatic switching means for train lighting and like installations, comprising a frame-work, an electric motor armature, a permanent field magnet and an auxiliary excitable field magnet effective upon said armature, clamping means holding said magnets together and supporting them from the frame work, a centrifugal governor attached to said armature a control switch device and an operative connection between said governor and said switch device.

8. Automatic switching means for train lighting and like installations, comprising an electric motor armature a constant excitation, field magnet effective upon said armature, a governor shaft attached to said armature, a governor spring coiled around said shaft, governor weights in the form of segments of a hollow body, said spring being enclosed within said hollow body when the weights are closed, a control switch device and an operative connection between said governor weights and said switch device.

9. Automatic electric regulator for an installation of the type set forth, comprising a variable speed electric motor, a centrifugal governor connected therewith, a pair of reciprocable brush devices in operative connection with said governor and a pair of parallel strips of regulating contacts each in the form of a flat commutator, the contacts of one strip being staggered in relation to those of the other for the purpose set forth.

10. Automatic electric regulator for an installation of the type set forth, comprising a variable speed electric motor consisting of an armature and a constant excitation field magnet, a centrifugal governor connected with said armature, rectilinearly reciprocable brush mechanism in operative connection with said governor and regulator contacts in the form of a flat straight commutator unit, said commutator unit comprising a support, a plurality of contact segments, insulation between said segments and between said segments and the support and clamping means for holding said segments together upon said support.

11. Automatic electric regulator for an installation of the type set forth, comprising a variable speed electric motor, a centrifugal governor connected therewith, reciprocable brush mechanism in operative connection with said governor and regulator contacts in the form of a flat commutator device, said brush mechanism comprising a frictionally rockable brush the effective surface of which consists of two faces at a slight angle to each other, one face being adapted for making contact with the commutator device during motion in one direction and the other during motion in the opposite direction.

12. Automatic electric regulator as claimed in claim 11, comprising in combination with the rockable brush, an auxiliary brush making a permanent flat contact with the commutator device.

13. Train lighting or like electrical installation having a variable voltage generator and embodying automatic voltage regulating means for a consuming circuit, comprising an electric motor consisting of an armature, a permanent field magnet and an auxiliary excitable field magnet connected to said installations, electrical connections between said motor and the generator, a centrifugal governor driven by said armature, a rheostat device disposed in series with said consuming circuit and an operative mechanical connection between said governor and rheostat device.

14. Train lighting or like electrical installation having a variable voltage generator and a consuming circuit supplied thereby and embodying automatic voltage regulating means for said consuming circuit comprising an electric motor, a constant field magnet and an auxiliary field magnet on said motor, an exciting winding on said auxiliary magnet, electrical connections between said exciting winding and said generator, a centrifugal governor driven by said motor, a rheostat disposed in series with said consuming circuit and generator and an operative mechanical connection between said governor and rheostat device.

15. Train lighting or like electrical installation having a variable load consuming circuit and a variable voltage generator supplying said circuit and embodying automatic voltage regulating means, comprising an electric motor, a constant field magnet and an auxiliary field magnet on said motor, an exciting winding upon said auxiliary magnet, electrical connections whereby said winding is disposed in series with said consuming circuit, a centrifugal governor driven by said motor, a rheostat device disposed in series with said consuming circuit and generator and an operative mechanical connection between said governor and said rheostat device.

16. Train lighting or like electrical installation having a variable load consuming circuit and a variable voltage generator supplying said circuit and embodying automatic voltage regulating means, comprising an electric motor, a constant field magnet and an auxiliary field magnet upon said motor, exciting windings upon said auxiliary magnet, one exciting winding being connected across said generator and a second exciting winding, which produces a magnetizing effect opposite to that of the first, being connected in series with said consuming circuit and generator, a centrifugal governor driven by said motor, a rheostat device in series with said consuming circuit and an operative mechanical connection between said governor and rheostat device.

17. Train lighting or like electrical installation having a variable load consuming circuit and a variable voltage generator supplying said circuit and embodying automatic voltage regulating means, comprising an electric motor, a constant field magnet and an auxiliary field magnet upon said motor, exciting windings upon said auxiliary magnet comprising a winding connected across the generator, a winding in series with the consuming circuit and generator and a winding energized by the generator and adapted to facilitate starting and exert a keeper effect upon the constant magnet under no load conditions, a centrifugal governor driven by said motor, a rheostat device in series with said consuming circuit and generator and an operative mechanical connection between said governor and said rheostat device.

18. An installation consisting of a variable voltage generator, a variable load consuming circuit supplied by said generator, a main load switch having principal contacts in said circuit and subsidiary contacts, and voltage regulating means for the consuming circuit comprising an electric motor, a constant field magnet and an auxiliary field magnet on said motor, a demagnetizing field winding in series with the principal contacts of the switch and with the consuming circuit and generator, a magnetizing winding adapted upon the closure of the switch to be connected through subsidiary contacts across the generator and a no load winding energized from said generator while the switch is open and short circuited by subsidiary contacts on its closure, a centrifugal governor driven by said motor, a rheostat device in series with said consuming circuit and generator and an operative mechanical connection between said governor and said rheostat device.

19. Automatic switching means for an electrical installation, comprising an electric motor sensitive to electrical variations in the installation, a centrifugal governor connected with said motor, motor circuit control means primarily operable by said governor upon change of motor speed, and installation control means secondarily operable by said governor as the result of a larger change of motor speed brought about by the operation of said motor circuit control means.

20. Automatic switching means for an electrical installation, comprising a variable speed electric motor, a centrifugal governor connected with said motor, motor speed control contacts, a sensitive mechanical connection between said governor and said contacts, slight governor motion being sufficient to operate said contacts, a switching device and a mechanical connection between said switching device and said governor operative in response to the speed control exercised by said contacts.

21. Automatic switching means for an electrical installation, comprising an electric motor armature, a constant field magnet, an auxiliary excitable field magnet, motor-speed control contacts in the circuit of said auxiliary magnet, a switching device, a centrifugal governor connected to said armature, operative mechanical connections between said governor and said contacts and said switching device, the former connection being such that a comparatively small change of motor speed responsive to an electrical variation in the installation results in the operation of said contacts by the governor, thereby modifying the field conditions of the motor and causing a substantially larger speed change sufficient for the governor to provide the mechanical effort necessary for the switching operation.

22. Automatic switching means for an electrical installation, comprising an electric motor armature, a constant and a variable field magnet, motor-speed control contacts in the exciting circuit of the latter, a switching device, a centrifugal governor driven by said armature, an operative mechanical connection between said governor and said contacts and an operative mechanical connection between said governor and said switching device, the first of said mechanical connections being such that a pre-determined slight rise above a normal motor speed responsive to an electrical variation in the installation opens said contacts, breaks the exciting circuit and causes a substantially larger rise of speed and the second of said connections being such that only said larger speed rise serves to operate the switching device.

23. Automatic switching means for an electrical installation, comprising a variable speed electric motor, electrical switch contacts in the armature and field circuits of said motor, a switching device, a centrifugal governor driven by said motor and operative mechanical connections between the governor and said field and armature switch contacts and said switching device, the arrangement being such that a slight rise of motor speed temporarily opens the field circuit at the switch contacts, the resultant larger rise of speed operates the switching device and a subsequent small fall in speed temporarily opens the armature circuit at the switch contacts, reducing the motor speed to substantially its initial value.

24. Automatic regulating means for an electrical installation, comprising a variable speed electric motor having an armature circuit connectible to said installation, motor-speed controlling contacts in said armature circuit, a progressive switching device for regulating said installation, a centrifugal governor driven by said motor, an operative connection between said governor and said contacts, operation of said contacts by a predetermined slight motor speed change serving to modify the armature current and magnify said speed change, and an intermittent feed mechanism arranged between said governor and switching device and effective to transmit to the latter governor motion resultant upon a magnified speed change.

25. A battery charging installation embodying a battery charging regulator comprising a variable speed electric motor, electrical connections between said motor and the battery poles, a centrifugal governor driven by said motor, motor speed controlling contacts operatively connected with said governor, small speed changes resultant upon predetermined charging voltage variations being magnified by the action of said contacts, and a progressive switching device adapted to be operated by said governor and to modify the charging current to the battery.

26. A battery charging installation embodying a generator, a generator excitation circuit, a battery and a battery charging regulator comprising a variable speed electric motor, said generator, battery and regulator being connected in a battery charging circuit, electrical connections between said motor and the battery poles, a centrifugal governor driven by the motor, speed controlling contacts located in the motor armature and field circuits and operatively connected with said governor, small speed changes resultant upon predetermined charging voltage variations being magnified by the action of said contacts, a sectional resistance in the excitation circuit of the generator, a progressive switching device associated with said sectional resistance and mechanical actuating means between said governor and switching device.

27. Automatic regulating means for an electrical installation comprising a variable speed electric motor having a field circuit connectible to said installation, motor-speed controlling contacts in said field circuit, a progressive switching device for regulating said installation, a centrifugal governor driven by said motor, an operative connection between said governor and said contacts, operation of said contacts by a predetermined slight motor speed change serving to modify the field current and magnify said speed change, and an intermittent feed mechanism arranged between said governor and switching device and effective to transmit to the latter governor motion resultant upon a magnified speed change.

28. Automatic regulating means for electrical installations having a consuming circuit, a motor comprising an armature, a permanent magnet field, and an excitable magnet field, means to supply current to said armature and circuit, means to supply current from the circuit to said exciting field, resistance controlling the current in the consuming circuit and mechanical means connected to said armature to vary the resistance in accordance with the speed of said armature.

ALFRED EDWARD HONEY.